United States Patent [19]
Basseggio

[11] Patent Number: 5,150,586
[45] Date of Patent: Sep. 29, 1992

[54] SYSTEM AND PROCESS OF COMPRESSING MISCIBLE FLUIDS

[76] Inventor: Narcizo O. Basseggio, Rua Pensilvania, 354/13, Sao Paulo, Brazil, SP-04564

[21] Appl. No.: 611,024

[22] Filed: Nov. 9, 1990

[30] Foreign Application Priority Data

Nov. 16, 1989 [BR] Brazil .................................. 8905970

[51] Int. Cl.$^5$ ........................ F25B 43/02; F04B 39/02
[52] U.S. Cl. .......................................... 62/468; 62/84; 62/510; 417/83; 417/338
[58] Field of Search .......................... 62/84, 468, 510; 417/83, 338

[56] References Cited

U.S. PATENT DOCUMENTS

| | | |
|---|---|---|
| 2,233,168 | 2/1941 | Johnson . |
| 2,246,244 | 6/1941 | Consley . |
| 2,253,623 | 8/1941 | Jordan . |
| 2,294,552 | 9/1942 | Gygax . |
| 2,869,775 | 1/1959 | Neubauer . |
| 3,009,632 | 11/1961 | Berger et al. . |
| 3,140,041 | 7/1964 | Kramer et al. . |
| 3,237,852 | 3/1966 | Shaw . |
| 3,243,101 | 3/1966 | Shaw . |
| 3,500,962 | 3/1970 | Kocher ............................. 62/468 X |
| 3,543,880 | 12/1970 | Scott ................................... 62/468 |
| 3,581,519 | 6/1971 | Garrett, Jr. et al. . |
| 3,621,670 | 11/1971 | Kinney ............................. 62/468 X |
| 3,719,057 | 6/1973 | Grant . |
| 3,785,169 | 1/1974 | Gylland, Jr. ...................... 62/510 X |
| 3,973,879 | 8/1976 | Ramm ............................... 417/79 X |
| 4,179,248 | 12/1979 | Shaw . |
| 4,411,141 | 10/1983 | Hara .................................... 62/468 |
| 4,505,650 | 3/1985 | Hannet et al. . |
| 4,530,215 | 7/1985 | Kramer ............................ 62/468 X |
| 4,551,989 | 11/1985 | Lindahl et al. ................... 62/510 X |
| 4,750,337 | 7/1988 | Glamm ............................... 62/468 |
| 4,767,281 | 8/1988 | Sailer .................................. 417/83 |
| 4,822,259 | 4/1989 | Basseggio . |
| 4,895,498 | 2/1990 | Basseggio . |
| 4,938,664 | 7/1990 | Zinsmeyer ......................... 417/83 |

FOREIGN PATENT DOCUMENTS

| | | |
|---|---|---|
| 0064018 | 4/1982 | France . |
| 131885 | 8/1982 | Japan . |
| 0149366 | 1/1984 | PCT Int'l Appl. . |
| PCT/BR86/-00009 | 7/1986 | PCT Int'l Appl. . |

OTHER PUBLICATIONS

ASHRAE Handbook (1984), pp. 24.16, 24.17.
Carrier, Handbook of Air Conditioning System Design, McGraw-Hill Book Company, pp. 3-65, 3-66.
Cruz Da Costa, Ennio, Refrideracao, 3rd Edition, pp. 162, 163.
Dossat, Roy J., Principios de Refrigeracion, Compania Editorial Continental, S.A., pp. 661, 662.
Trane Air Conditioning Manual, The Trane Company, pp. 176, 177.

*Primary Examiner*—Henry A. Bennet
*Assistant Examiner*—Christopher Kilner
*Attorney, Agent, or Firm*—Arnold, White & Durkee

[57] ABSTRACT

A system and process of parallel compressors for compressing fluids miscible with oil. The present invention utilizes parallel-coupled compressors, wherein each compressor comprises a crankcase chamber, discharge chamber, suction chamber, and ejector which operate independent of one another. Means are provided for coupling the ejector in the return of the lubrication pump oil within the crankcase chamber and the maintenance of that oil level in all the crankcase chambers regardless of each compressor capacity and quantity with which they are operating or are not operating. The transference of suction chamber oil to crankcase chamber is performed by the ejector via energy from the lubrication pump contained within each crankcase chamber. Further, transference of oil from suction chamber to crankcase chamber via an ejector performs all necessary equalization functions.

14 Claims, 2 Drawing Sheets

5,150,586

SYSTEM AND PROCESS OF COMPRESSING MISCIBLE FLUIDS

BACKGROUND OF THE INVENTION

This invention relates to a device for compressing fluids (vapor and gas), by means of compressors arranged in a parallel configuration. More specifically, the present invention is directed toward an improved device for controlling oil and pressure variants contained within the parallel compressors used, for example, in refrigeration units. The improved device of the present invention may eliminate oil separators generally found in conventional refrigeration units using parallel compressors.

Refrigeration systems with refrigerant miscible with lubricating oils, are common in the refrigeration industry. To provide proper lubrication as well as continuous circulation of spanned and compressed refrigerant, both oil and refrigerant are mixed, or are miscible, while the refrigerant is in its liquid phase. Oil and refrigerant are separated once the refrigerant is placed in its vapor or gas phase. Thus, typical refrigeration systems utilize compression and expansion means whereby refrigerant is cycled between a compressed phase and an expanded phase. Expanded refrigerant allows heat transfer such that cool air can be drawn from cooling coils through which the expanded, cooled refrigerant circulates. In contrast, compressed refrigerant circulated through heating coils provides a warm exchange surface for expelling warm air outside of the conditioned air space. It is the compressed refrigerant stage, or more particularly, the compressor which constitutes the present invention.

For a compressor to operate properly during its continuous compression of refrigerant, it is necessary to control the oil flow rate and/or deposits contained within the cycled refrigerant. Overflowing (i.e., lowering of) in the level of the compressor crankcase oil can be avoided by providing the oil return through the suction line and its transference to the crankcase chamber. The transference of oil throughout the system to prevent excess oil buildup or overflowing of one portion of the system, while starving another portion, is of critical importance in the longevity and efficiency of a parallel refrigeration compressor system. In a refrigeration system with only one compressor, it is relatively easy to maintain a tolerable rate of oil in the fluid and a relatively constant level of oil in the crankcase chamber. However, the problem is aggravated by the installation of two or more compressors in parallel, mainly when the compressors have different capacities or even when some of the compressors maintain operation while others are stopped. In a parallel compressor configuration, oil leaving the crankcases does not coincide with the route taken by the oil entering the crankcases. Thus, oil often builds in one or more compressor crankcases leaving other parallel crankcases substantially void of oil. This subjects some compressors to the risk of overflowing of "liquid hammers" while subjecting others to the risk of the lack of lubrication.

The problems concerning the return and differences in the oil level in parallel compressor crankcases is spearheaded by the recent popularity of parallel compressor systems. High efficiency air conditioning units often utilize parallel compressors. However, attempts to maintain longevity and efficiency within parallel systems are compounded by the problems recited hereinabove. The solution proposed by U.S. Pat. No. 4,822,259, of the same inventor, addresses the concept of equalizing oil level and pressure between crankcase chambers. U.S. Pat. No. 4,822,259, however, requires a conventional oil separator that controls the rate of oil dissolved in the refrigerant as well as the levelling of oil in all of the parallel compressor crankcases composing the system.

SUMMARY OF THE INVENTION

Accordingly, it is desirable to provide a parallel compressor unit which can equalize oil levels and vapor pressures according to the present invention. More particularly, it is desirable to provide equalization without necessarily having to utilize a conventional oil separator. The present invention separates oil from the evaporated, gaseous refrigerant simultaneously with the oil and pressure equalization process by using capillary means connected between the suction manifold and the crankcase chambers, pressure of each crankcase chamber can be regulated with the pressure contained within the suction manifold. Further, means are provided for connecting each ejector to each suction chamber contained within each compressor for transferring oil accumulated within the suction chamber to the crankcase chamber.

In a preferred embodiment, the capillary means comprises a crankcase suction line connecting the suction manifold to the crankcase at a point above the oil level within the crankcase for delivering equalizing pressure to each crankcase chamber. The capillary means includes a tube of sufficient gauge to allow passage of gas therein.

In another preferred embodiment, the capillary means comprises a crankcase suction line having a first calibrating means for metering the amount of equalizing pressure delivered from the suction manifold to each crankcase chamber. The first calibrating hole provides additional regulation beyond that which inherently exists within and between each crankcase chamber.

In still another preferred embodiment, a second calibrating hole means can be connected between the suction chamber and the crankcase chamber of each compressor for delivering equalizing pressure from the suction chamber to the crankcase chamber. The second calibrating hole, like the first calibrating hole, provides additional regulation to the flow of gas to the crankcase chambers beyond that which is inherent within each crankcase chamber.

The present invention therefore provides an improved system of regulating the oil level and vapor pressure within and between parallel compressors. An oil separator of conventional art is not part of the preferred embodiment. However, it may be used, if desired, without damage to the function of the invention. Thus, associated hardware and inefficiencies normally found in oil separators do not exist in the present invention. These and other advantages of this invention will be further appreciated from the drawings and the detailed description below.

DETAILED DESCRIPTION OF PREFERRED EMBODIMENTS

Figure 1:
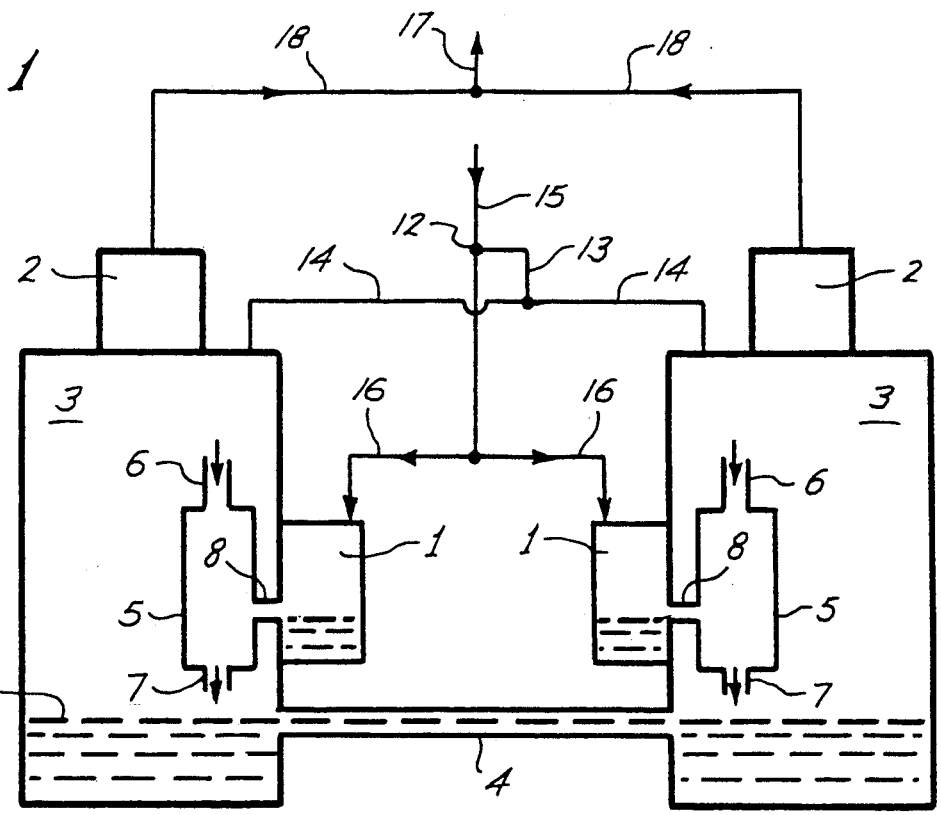
FIG. 1 is a schematic view of one embodiment of the present invention.

Referring to the drawings, FIG. 1 is a schematic view showing two compressors, wherein each compressor comprises a suction chamber 1, discharge chamber 2, and crankcase chamber 3 arranged independent of one another. The general suction line 15 is divided or regulated into two divided suction lines 16 for inputs to each compressor. The refrigerant carried to the compressors by suction forces enters suction chamber 1, where it is then compressed and then delivered to discharge chamber 2. Compression is achieved, for example, by pistons within each compressor (not shown in FIG. 1). The compressed refrigerant is discharged from discharge chamber 2 and into divided discharge lines 18 connected to general discharge line 17. The refrigeration process or expansion/compression cycle carried out between general discharge line 17 and general suction line 15 is not shown in either FIGS. 1, 2 or 3 since it is the compression substep of the cycle and not the cycle itself which is related to the present invention.

By operating crankcase chamber 3 independent of suction chamber 1 and discharge chamber 2, the present invention achieves equalization of all the parallel-coupled crankcase chambers with equalized pressure, giving assurance of the same oil surface level 19 within and between parallel-coupled compressors due to the advantage of the gravity forces over the oil.

An equalization tube 4 is used to allow the oil and refrigerant to freely flow through and between crankcase chambers 3 with the assurance of the same surface level 19 throughout. It is preferred that equalization tube 4 be horizontally arranged, whereby part of its tube diameter is occupied by oil and part by vapor. Also, instead of using a single tube 4, it is possible to use two tubes, one totally submersed into the oil and the other above the oil to allow the exchange of both oil and vapor among the crankcases giving assurance of the same oil and surface level 19.

The free flow of oil and vapor through equalization tube 4 is attained on condition that the crankcase chambers are independently arranged. However, it is necessary to feed crankcase chamber 3 preferably with the suction pressure which operates the parallel compressor system. The crankcase chamber pressure feed can be performed in three distinct ways as shown by the three preferred embodiments in FIGS. 1, 2 and 3.

The first embodiment, shown in FIG. 1, relates to measuring the suction pressure at a separation point 12 in receptacle 15 by means of a capillary tube 13. Capillary tube 13 divides incoming gas refrigerant into two branches 14. Divided crankcase suction line 14 provides input vapor pressure feed for each compressor by connecting to crankcase chamber 3 at a point above the oil level 19.

Figure 2:
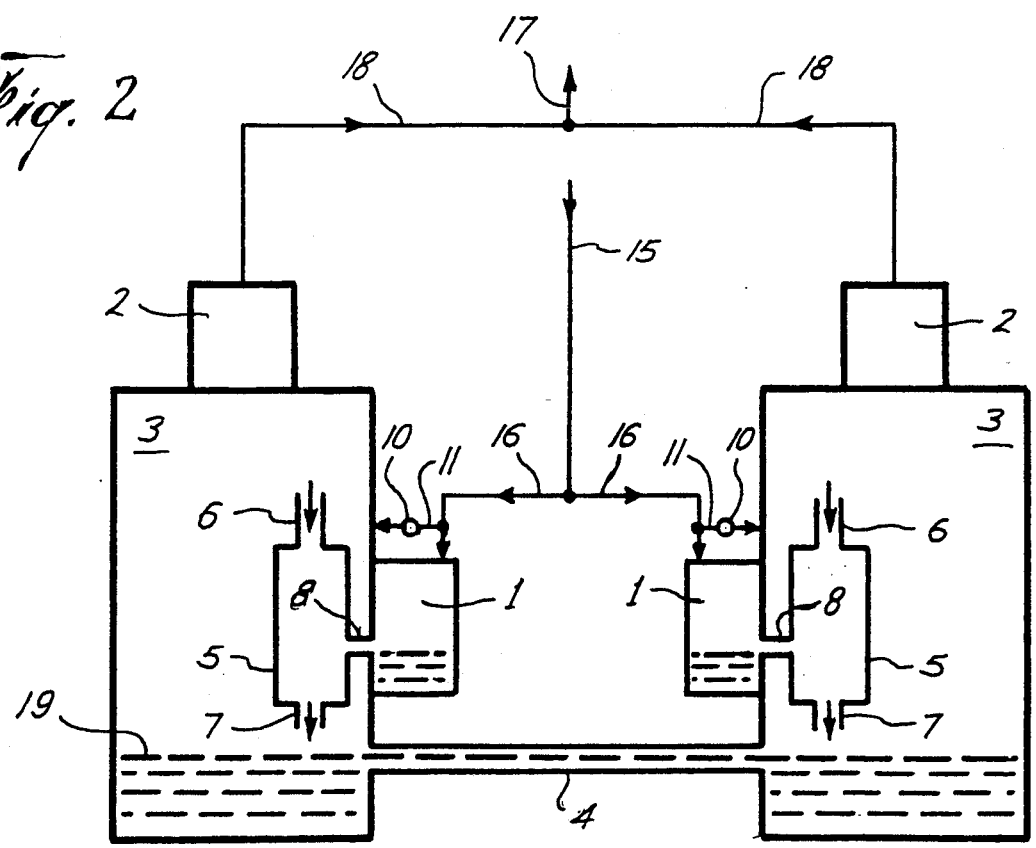
FIG. 2 is a schematic view of another embodiment of the present invention.

FIG. 2 illustrates a second alternative preferred embodiment, wherein crankcase chamber pressure feed is provided by connecting pressure intake of divided suction line 16 to crankcase chamber 3 via capillary tubes 11. In addition to inputting oil and vapor into suction chamber 1, FIG. 2 illustrates that the vapor can be metered by a calibrating hole 10 into crankcase chambers 3. The second alternative embodiment prefers that capillary tube 11 be interrupted by a calibrating hole 10.

Figure 3:
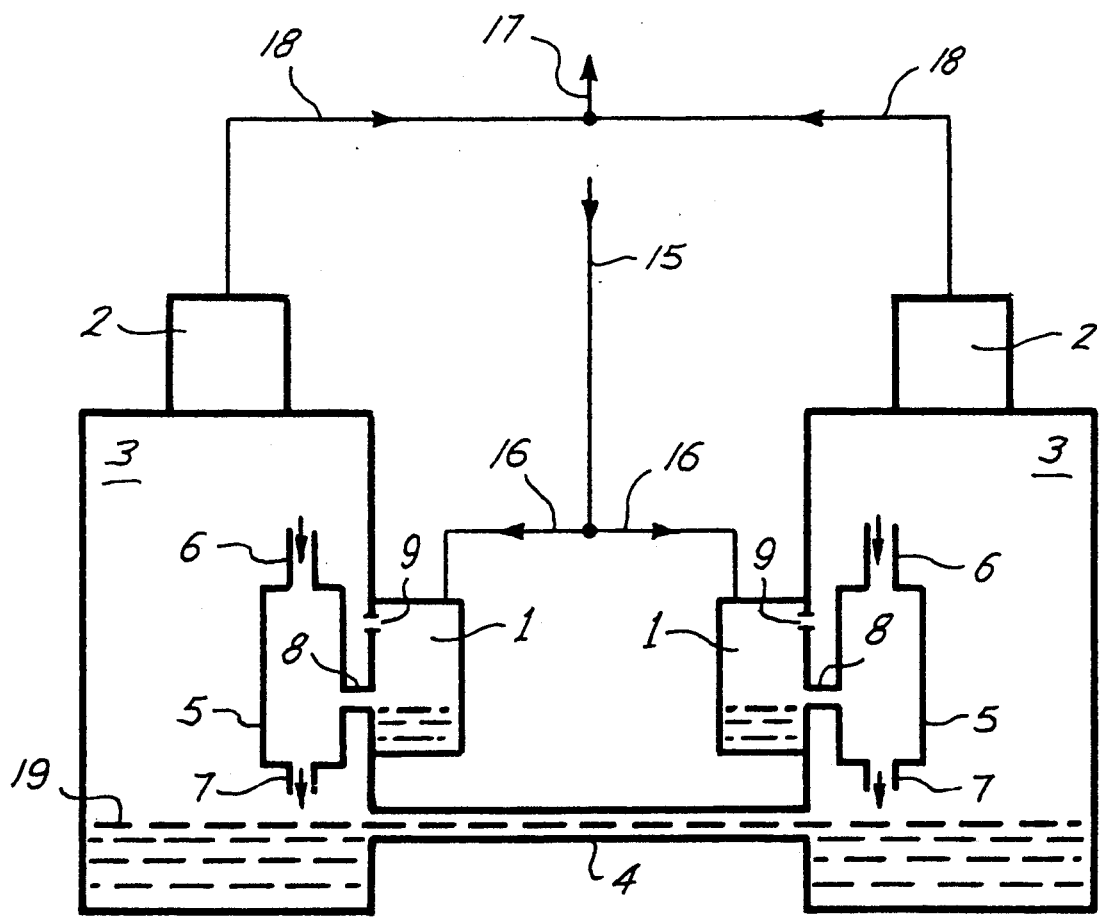
FIG. 3 is a schematic view of yet another embodiment of the present invention.

FIG. 3 illustrates the third alternative preferred embodiment using a passage and second calibrating hole 9 on the dividing cover separating crankcase chamber 3 from suction chamber 1 at a point above oil level 19 for each compressor unit.

The use of a small gauge capillary tube or calibrating hole for the three alternative embodiments of the crankcase chamber pressure feed system is aimed at restraining the exchange of vapor among crankcase chambers 3 and suction chambers 1. The exchange of vapor is offset by equalization tube 4 to minimize or substantially prevent turbulence on the oil surface 19 during the input of pressure vapor feed. The present invention achieves very little disturbance or turbulence on oil surface 19. Therefore, by minimizing such disturbance, oil-vapor mix within each crankcase chamber 3 is minimized.

Compressors for refrigeration and the like are equipped with a forced lubrication system using a pump coupled to a crankshaft (not shown) within crankcase chamber 3. The oil pump is standardized by compressor manufacturers with a rate of flow larger than that necessary so as to ensure oil within chamber 3 is recycled in closed circuit with the oil deposited within chamber 3. The lubrication pump oil return is usually equipped with adjustable spring valve for the adjustment of lubrication pressure which might vary as the clearance of mechanical pieces increases due to wear.

The return of oil proceeding from the lubrication pump is represented in FIG. 1 by tubes 6. The oil return 6 is coupled to ejector 5 designed to fully utilize this oil flow energy to pump the return oil through the suction line once deposited at the bottom of suction chamber 1. The oil returning from the lubrication pump through tube 6 draws, by suction, the oil deposited at the bottom of suction chamber 1 through ejector suction passage 8. Thus, the oil leaving tube 7 represents both the oil returning from tube 6 and the oil drawn through tube 8. Ejector 5 and the means by which the pump and ejector draw excess oil from chamber 1 through tube 8 is one of the essential features of the present invention. Oil levels are maintained by the "drawing" force of the lubricating pump found in all conventional compressors within ejector 5.

The energy of return oil flow through tube 6 causes displacement of oil and refrigerant from suction chamber 1 to crankcase chamber 3 of each compressor and unit. However, this displacement of oil and refrigerant vapor is relatively small such that any difference among the compressors is easily compensated for by equalization tube 4. Of importance is the fact that equalization tube 4, in operation with an unbalanced pressure between suction chamber 1 and crankcase chamber 3, resets the pressure among all crankcase chambers and maintains a constant oil level 19.

Thus, the present invention provides operation of parallel compressors in an oil-equalized efficient manner. The independence of crankcase chambers 3, together with the drawing of oil from suction chamber 1 by means of ejector 5 coupled to the return of lubricating pump, ensures the exchange of oil between suction chamber 1 and crankcase chamber 3 with a minimum exchange offset by the equalization tube 4. Further, the present invention does not require that all parallel-coupled compressors be operating, or that all compressors be operating at the same rate. The independence of crankcase chamber 3 allows separate equalization and lubrication throughout the system.

The foregoing description of the invention has been directed to particular preferred embodiments of the present invention. It will be apparent, however, to those skilled in the art that modifications and changes in both apparatus and method may be made without departing from the scope and spirit of the invention. For example, capillary tubes were shown as small gauge tubes and therefore, encompass any type of tube which can transmit vapor within a conventional refrigeration system. Additionally, first and second calibrating holes are any type of metering device which can control or regulate the amount of vapor therethrough. Still further, any type of conventional lubricating pump and ejector is efficient to provide drawing means to oil contained within suction chamber 1. Therefore, it is Applicant's intention in the following claims to cover all equivalent modifications and variations which fall within the true spirit and scope of this invention.

What is claimed is:

1. A system of parallel compressors for compressing fluids miscible with oil, comprising:
   a plurality of compressors connected in parallel;
   a suction chamber, a discharge chamber, a crankcase chamber and an ejector contained within each said compressor and independent of one another, said ejector including return lubricating oil means used to create an ejector motive force;
   conduit means for connecting the crankcase chambers in oil and gas flow communication with one another;
   a suction manifold connected to each said suction chamber;
   capillary means connected between said suction manifold and said crankcase chambers for equalizing the pressure of each said crankcase chamber with the pressure of said suction manifold; and
   means connected between said ejector and said suction chamber within each said compressor for transferring the oil level between said crankcase chamber and said suction chamber.

2. The system as recited in claim 1, wherein said conduit means comprises at least one horizontal tube connecting said crankcase chambers in oil and gas flow communication with one another.

3. The system as recited in claim 2, wherein said horizontal tubes are arranged such that at least one tube is positioned at a higher level on said crankcase chamber whereby gas occupies said tube and, at least one tube is positioned at a lower level on said crankcase chamber whereby oil occupies said tube.

4. The system as recited in claim 1, wherein said capillary means comprises a crankcase suction line connecting said suction manifold to said crankcase at a point above the oil level within said crankcase for delivering equalizing pressure to each said crankcase chamber.

5. The system as recited in claim 4, wherein said crankcase suction line comprises a first calibrating hole means for metering the amount of equalizing pressure to be delivered to each said crankcase chamber.

6. The system as recited in claim 5, wherein said first calibrating hole means is connected such that the amount metered away from said crankcase chamber will enter said suction chamber of respective said compressor.

7. The system as recited in claim 1, further comprising a second calibrating hole means connected between said suction chamber and said crankcase chamber of each said compressor for delivering equalizing pressure to each said crankcase chamber.

8. A system of parallel compressors for compressing fluids miscible with oil, comprising:
   a plurality of compressors connected in parallel;
   a suction chamber, a discharge chamber, a crankcase chamber and an ejector contained within each said compressor, said ejector including return lubricating oil means used to create an ejector motive force;
   at least one horizontal tube connecting said crankcase chambers in oil and gas flow communication with one another, said horizontal tubes being arranged such that at least one tube is positioned a higher level on said crankcase chamber whereby gas occupies said tube and, at least one tube is positioned at a lower level on said crankcase chamber whereby oil occupies said tube;
   a suction manifold connected to each said suction chamber;
   capillary means connected between said suction manifold and said crankcase chambers for equalizing the pressure of each said crankcase chamber with the pressure of said suction manifold; and
   an ejector suction passage connecting said ejector and said suction chamber within each said compressor for drawing excess oil from said suction chamber having the highest oil level and delivering said excess to connected said crankcase chamber via said ejector for subsequent dispersion from said crankcase chamber to connected other said crankcase chamber through said horizontal tubes.

9. The system as recited in claim 8, wherein said capillary means comprises a crankcase suction line connecting said suction manifold to said crankcase at a point above the oil level within said crankcase for delivering equalizing pressure to each said crankcase chamber.

10. The system as recited in claim 9, wherein said crankcase suction line comprises a first calibrating hole means for metering the amount of equalizing pressure to be delivered to each said crankcase chamber.

11. The system as recited in claim 10, wherein said first calibrating hole means is connected such that the amount metered away from said crankcase chamber will enter said suction chamber of respective said compressor.

12. The system as recited in claim 8, further comprising a second calibrating hole means connected between said suction chamber and said crankcase chamber of each said compressor for delivering equalizing pressure to each said crankcase chamber.

13. The system as recited in claim 8, wherein said ejector suction passage allows regulated amounts of oil to be drawn from said suction chamber in response to a vacuum created within said ejector.

14. The system as recited in claim 8, wherein said ejector has an inlet port for receiving return oil from respective said crankcase chamber and excess oil from respective said suction chamber, and wherein said ejector has an outlet port for expelling the return oil and the excess oil to said crankcase chamber for dispersion to other connected crankcase chambers via said conduit means.

* * * * *